United States Patent [19]

Kimball et al.

[11] 4,095,633

[45] Jun. 20, 1978

[54] WOODCARVER AND ENGRAVER MACHINE

[76] Inventors: Jerome W. Kimball, 14 W. 43rd St., Savannah, Ga. 31401; Kenny H. Kimball, 2401 Dolphin Dr., Savannah, Ga. 31406

[21] Appl. No.: 758,049

[22] Filed: Jan. 10, 1977

[51] Int. Cl.² .......................... B27Q 35/04; B27C 5/10
[52] U.S. Cl. .............................. 144/144 R; 144/134 B; 90/13.1
[58] Field of Search ........... 144/144 R, 144 A, 134 R, 144/134 B; 90/13.1, 13.2, 13 B, 13 R

[56] References Cited

U.S. PATENT DOCUMENTS

| 528,337 | 10/1894 | Morgeneier | 144/144 A |
| 1,471,869 | 10/1923 | Turner | 144/134 B |
| 3,099,299 | 7/1963 | Gilfry | 144/144 R |
| 3,301,288 | 1/1967 | Norlie et al. | 144/144 R |
| 3,434,385 | 3/1969 | Ray | 144/144 R |

*Primary Examiner*—Donald R. Schran
*Attorney, Agent, or Firm*—Cushman, Darby & Cushman

[57] ABSTRACT

An improved engraving device, particularly for making wooden signs, with a unitary carriage assembly supporting both a template tracing device including a stylus for tracing a design or character and a router in a fixed relationship to each other so that the carriage assembly can be manually moved freely in a horizontal plane to move both the tracing device as it traces a template and the cutting tool as it engraves a sign. The template and workpiece are preferably both located along the front side of the machine so that each can be observed by the operator during engraving. In the preferred exemplary embodiment, the tracing stylus and the cutting element in the engraving tool are aligned along a vertical axis and the stylus is spring mounted so that the stylus can be placed witin the pattern on the template prior to the cutting element cutting into the workpiece.

14 Claims, 8 Drawing Figures

WOODCARVER AND ENGRAVER MACHINE

BACKGROUND OF THE INVENTION

The invention relates to an improved engraving apparatus, particularly for cutting wooden signs. Many types of engraving devices for use in engraving a variety of materials have been developed and used in the past. These include relatively simple engravers which employ a small guide which can be attached to the bottom of the router to aid the operator in engraving a workpiece, such as a redwood sign. The guide moves with the router so that the design can be drawn on the board adjacent the area cut and followed with the guide. The edge of the board can also be used as a reference. The quality of the engraving, however, from such a simple engraving device depends upon the skill of the operator in maneuvering the router across the surface of the workpiece with the aid of the guiding device. In addition, since the engraving is freehand, it is difficult to exactly reproduce any sequence of letters, numbers, marks or the like.

Another type of engraving guide device includes a clamp which holds a template for a single letter or word. A router is then used to cut within the guidelines provided by the template. Since the router covers the template and workpiece, it is difficult to follow the pattern on the template, and the clamp (in some instances) damages or mars the workpiece. With this device as well, the quality of the engraving varies with the skill of the operator.

More sophisticated engraving tools have also been known which have used a template and a tracing linkage connected to a router to help guide the router or cutting element across the surface of a workpiece. In this way, the ability to reproduce designs is improved but use of such devices requires a more skilled operator. Such devices, however, suffer from additional problems, the most usual involving manipulation of the tracing linkage employed to help guide the cutting element.

Such linkages are usually complicated and have a plurality of separate linkage arms connected together. To minimize resistance to movement, the tracing linkage structure is usually made of light construction with the result that the linkage can easily bend during use, making it difficult to keep the tracing element within the template pattern and, at the same time, direct movements of the router. If the tracing linkage is of heavy duty construction, the engraving apparatus is unwieldly and difficult to control. In both of the above instances, tracing (and thus the resulting engraving) is less than precise.

Another problem associated with prior art engraving devices concerns applying sufficient force to the cutting element to properly engrave the workpiece and yet not place an excessive amount of stress on the tracing mechanism. If excessive force is used, the tracing mechanism can damage the template, can be bent itself, or in some other way be impaired so as to make subsequent engravings more difficult or impossible.

The patent to Edwards (U.S. Pat. No. 3,301,287) describes a prior art device of this type in which the template is located directly in front of the router during use. With this type of arrangement, it is difficult to manipulate the router and closely observe the tracing stylus and template at the same time. U.S. Pat. No. 3,171,207 describes another device of this sort.

Further, in most devices of this sort, the tracing and cutting elements are linked together so that the tracing stylus contacts the template at the same time that the router begins cutting into the workpiece. Thus, if the tracing element is incorrectly or inadvertently placed on the wrong part of the template, a permanent cut is made into the workpiece at an incorrect point. This is particularly a problem with devices of the sort which employ templates which are not located directly in the front of the operator or are not in a position relative to the workpiece which permits the template and workpiece to be easily observed simultaneously.

SUMMARY OF THE PRESENT INVENTION

The preferred exemplary embodiment of the present invention, which is described hereinafter, is comprised of an engraving device for engraving workpieces, such as redwood signs. The present invention will allow a relatively unskilled operator to efficiently, effectively and rapidly produce a great number of engravings of consistent quality and with a minimum of error.

The preferred exemplary embodiment of the present invention includes a frame assembly which can be either portable, and thus readily moved from job to job as the necessity requires, or permanently secured to an appropriate base.

Thus, the primary object of the present invention is to provide an engraving device which will quickly and efficiently reproduce patterns in a workpiece, such as a wooden sign.

Another object is to provide an engraving device which includes a spring-loaded stylus which can be placed into positive contact with a template prior to any contact between the cutting element and the workpiece.

A further objective of the present invention is to provide an engraving device in which the pattern template and the workpiece are both in full and clear view of the operator during engraving.

Still another objective of the present invention is to provide a unitary structure which supports both the tracing mechanism and the cutting element in separate vertically spaced horizontal planes without the need for any additional linkage mechanisms therebetween.

These and other objectives will become clearer in the description which follows together with the figures in which.

Figure 1:
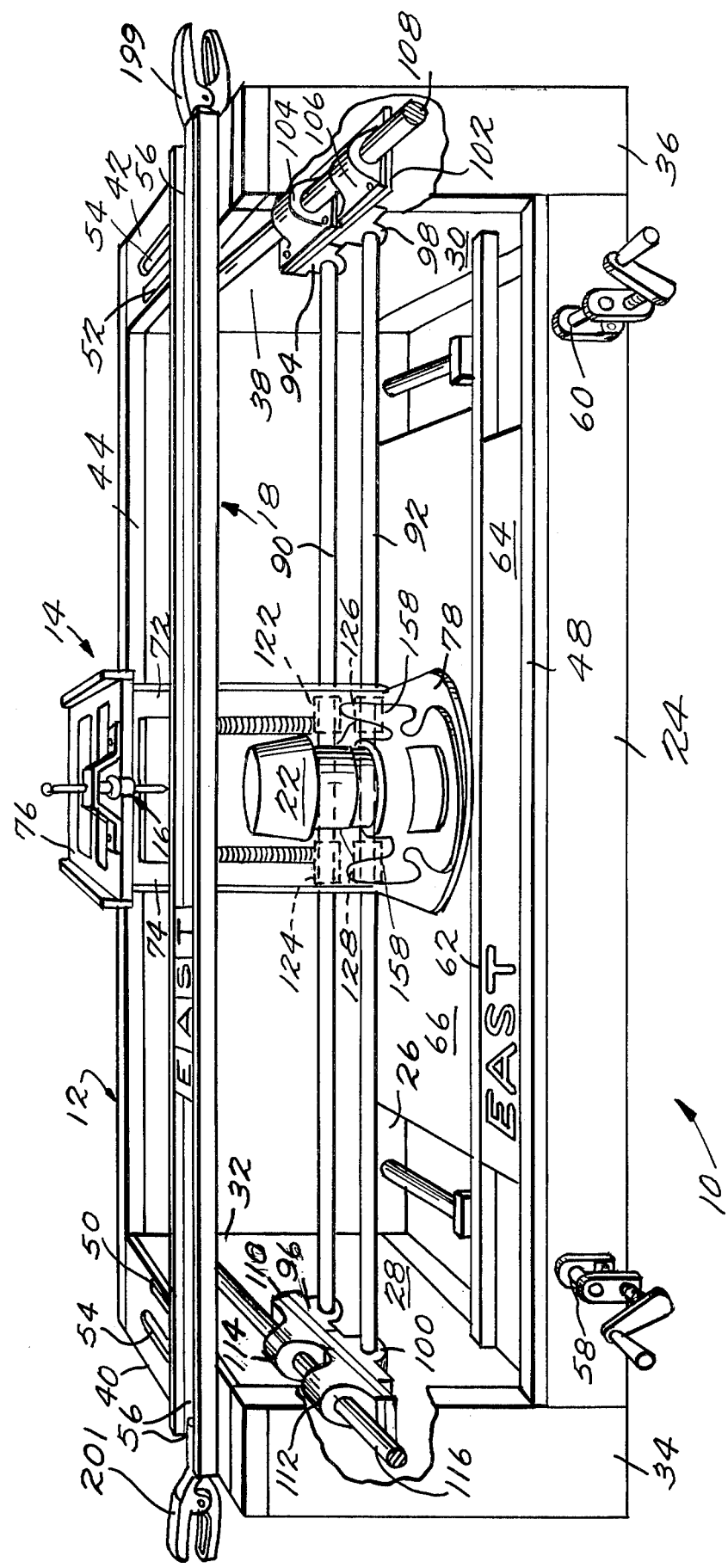
FIG. 1 is a perspective view of the front of the engraving device of this invention.
Figure 2:
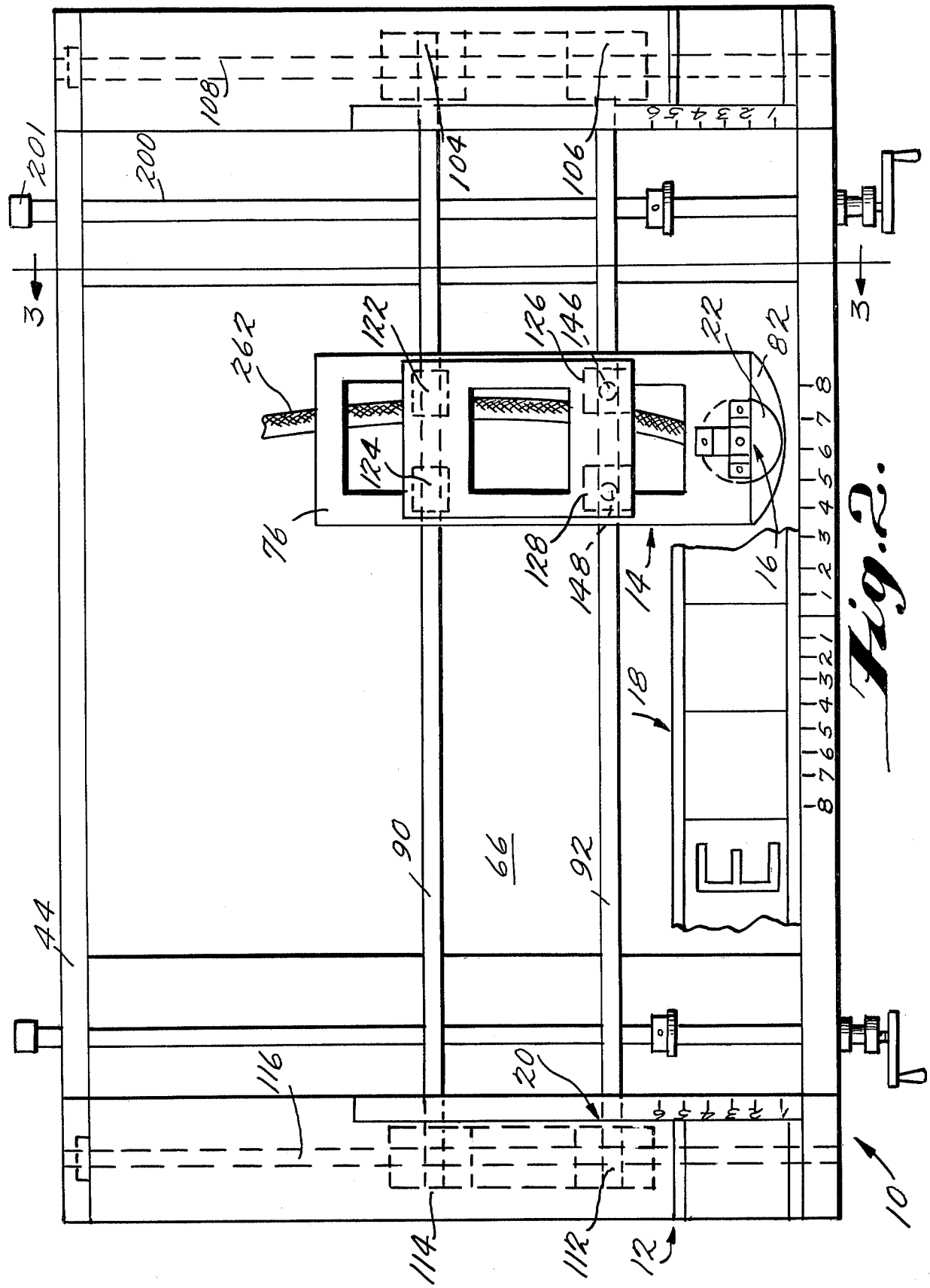
FIG. 2 is a top plan view of the engraving machine.
Figure 3:
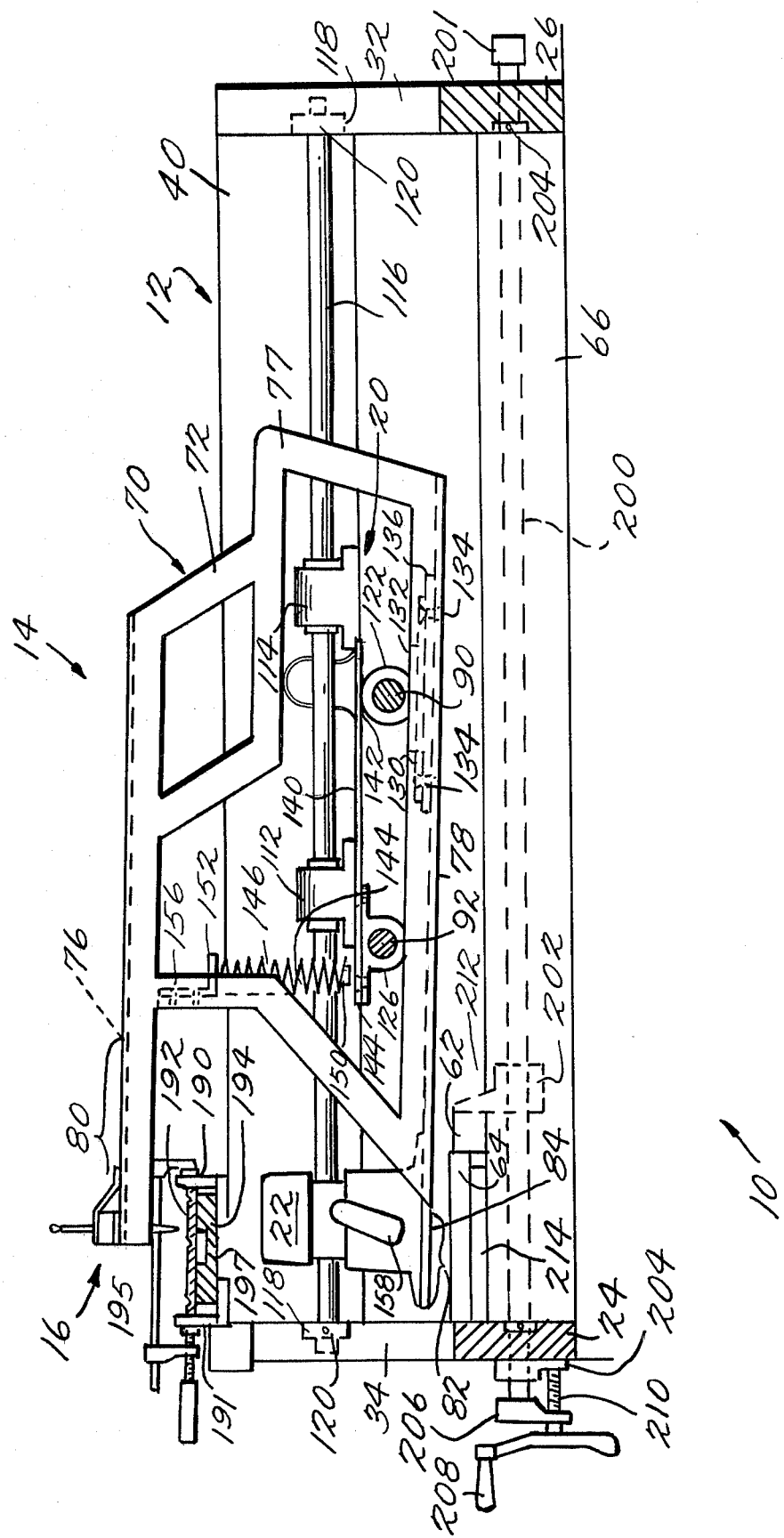
FIG. 3 is a cross-sectional side view taken along line 3—3 in FIG. 2.

Turning now to the Figures, and in particular to FIGS. 1-3, the preferred exemplary embodiment of the engraving machine described in this application is generally indicated at 10 and is comprised of a frame assembly 12, a carriage assembly 14, a stylus assembly 16, a template assembly 18, a support assembly 20 for the carriage assembly 14 and a conventional router 22.

The frame assembly 12 consists of front and rear horizontal base members 24 and 26 and side base members 28 and 30. The base members 24, 26, 28 and 30 are preferably secured together in any suitable way so as to effectively form a rectangular frame with vertical support members 32, 34, 36 and 38 extending upwardly therefrom and in particular from the corners thereof. While the vertical supports 32, 34, 36 and 38 can be attached to the respective base members 24, 26, 28 and 30 by any convenient means (such as be welding), it should be understood that any other conventional method of joining these members together likewise can be used. Regardless of how the frame members are secured together, however, it is only essential that a frame assembly be provided which is strong and which can suitably mount the other assemblies.

Extending between the vertical supports 32 and 34 and 36 and 38 are top horizontal frame members 40 and 42, respectively. The top horizontal frame members 40 and 42 can be connected to their respective vertical supports by any convenient means as, for example, by welding or bolts (not shown). A top frame brace 44 extends along the rear of frame assembly 12 between vertical supports 32 and 38 and can be bolted or otherwise attached thereto. Brace 44 as shown is formed of angle iron, but any form of structural bracing material can equally well be used. It should be noted that each end of the frame 12 is provided with an opening defined by members 28, 32, 34 and 40 and 30, 36, 38 and 42, respectively. Such openings allow workpieces which are longer than the length of frame 12 to be placed within frame assembly 12 and engraved.

As best shown in FIG. 1, a centering scale and front stop 48 is provided on the top surface of the front base member 24. Two additional centering scales 50 and 52 are provided on the top horizontal frame members 40 and 42, respectively, with the workpiece 64, so as to aid in correctly aligning the template assembly 18.

The top horizontal frame members 40 and 42 are each provided with a slot 54 which extends along the length of each member beside the respective scales 50 and 52 for moving template assembly 18 therealong. A bolt and nut assembly 56 retains template assembly 18 in any desired position along the length of frame members 40 and 42.

Frame assembly 12 is also provided with clamping devices 58 and 60 which are each supported by frame members 24 and 26 and serve, together with push rod 62 and platform 66, to hold the workpiece 64 in a correct position beneath router 22. Platform 66 extends between base members 24 and 26 and provides vertical support for workpiece 64.

Referring now to FIGS. 1, 3, 5, and 6, the carriage assembly 14 is comprised of one-piece sidewalls 72 and 74, a top member 76, a rear member 77 and a bottom member 78. The sidewalls 72 and 74, the top 76 and bottom 78 and the rear member 77 are all rigidly secured together by any convenient means, such as welding, bolts or screws (not shown). Both the top member 76 and the bottom member 78 are, respectively, provided with portions which extend toward the front of the machine at 80 and 82, respectively. The stylus assembly 16 is supported on the front end of extension portion 80 whereas the router 22 is supported on the front extension 82 of the bottom member 78. As is shown in FIG. 3, in the preferred exemplary embodiment of the invention, the stylus assembly 18 is vertically aligned with the conventionally cutting element 84 of the router 22. However, it should be understood that such axial alignment is not essential and suitable adjustments can be made with respect to the location of the template and a workpiece, respectively, with regard to the stylus assembly 16 and the cutting element 84 so that a one-to-one relationship exists between the stylus assembly 16 and the cutting element 84 so that the correct pattern will be properly engraved on workpiece 64.

Carriage assembly 14 is movably supported within the frame 12 by support assembly 20. Specifically, and as shown in FIG. 1, the housing is supported on two guide rods 90 and 92 which extend parallel to base members 24 and 26. Guide rod 90 is supported at its respective ends by support blocks 94 and 96 while guide rod 92 is supported at its respective ends by support blocks 98 and 100. Support blocks 94 and 98 are attached to a support plate 102 by any convenient means such as screws (not shown). Support plate 102 is attached to slide bearings 104 and 106 by suitable screws, and bearings 104 and 106 are in turn slidingly retained on guide rod 108 which is secured to and extends between vertical support members 36 and 38 beneath frame member 42.

Support blocks 96 and 100 are each joined or attached to a support plate 110 by screws (not shown), and support plate 110 is attached by any convenient means (such as screws) to slide bearings 112 and 114. Bearings 112 and 114 are, in turn, slidably retained on guide rod 116 which extends between and is attached to vertical supports 32 and 34 beneath frame member 40.

As is shown in FIG. 3, each end of the guide rods 108 and 116 can be attached to their respective vertical supports in any convenient fashion, such as by welding or by means of a support collar 18 welded to the vertical support and engaging set screw 120.

Figure 5:
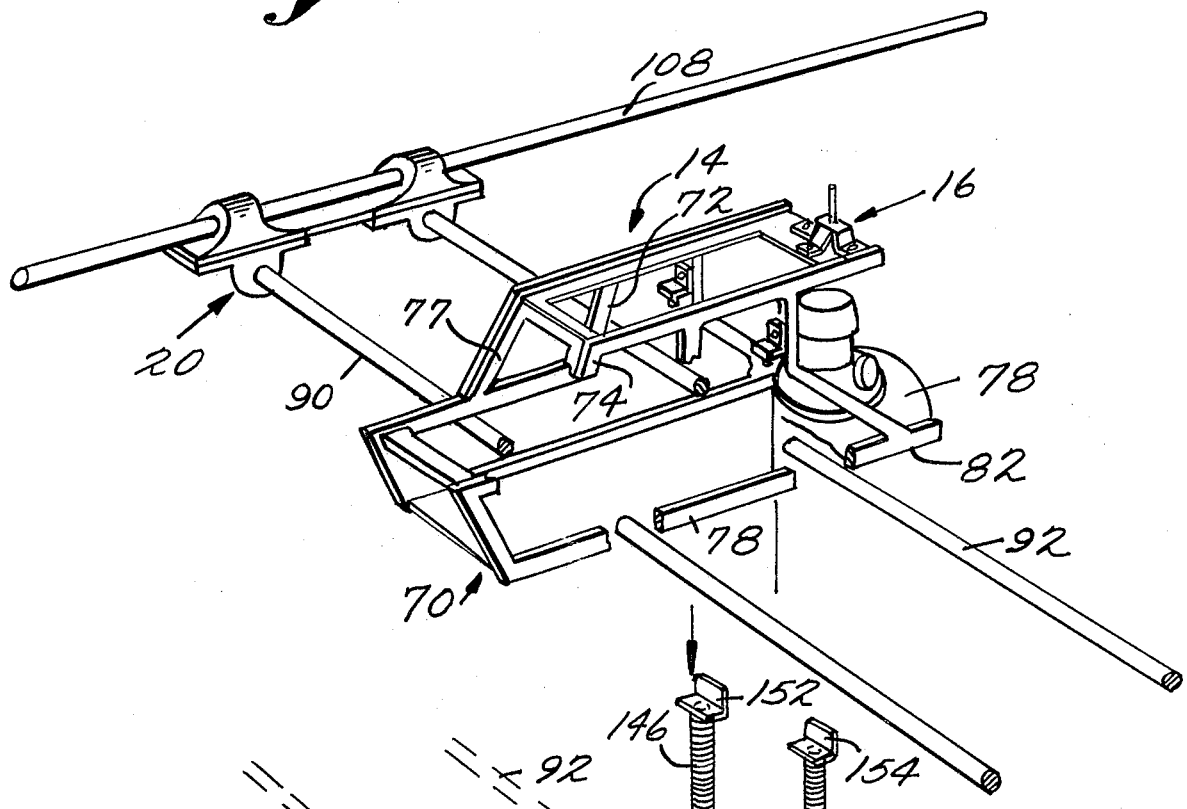
FIG. 5 is a perspective view of the unitary carriage assembly supporting the stylus assembly and the cutting device.
Figure 6:
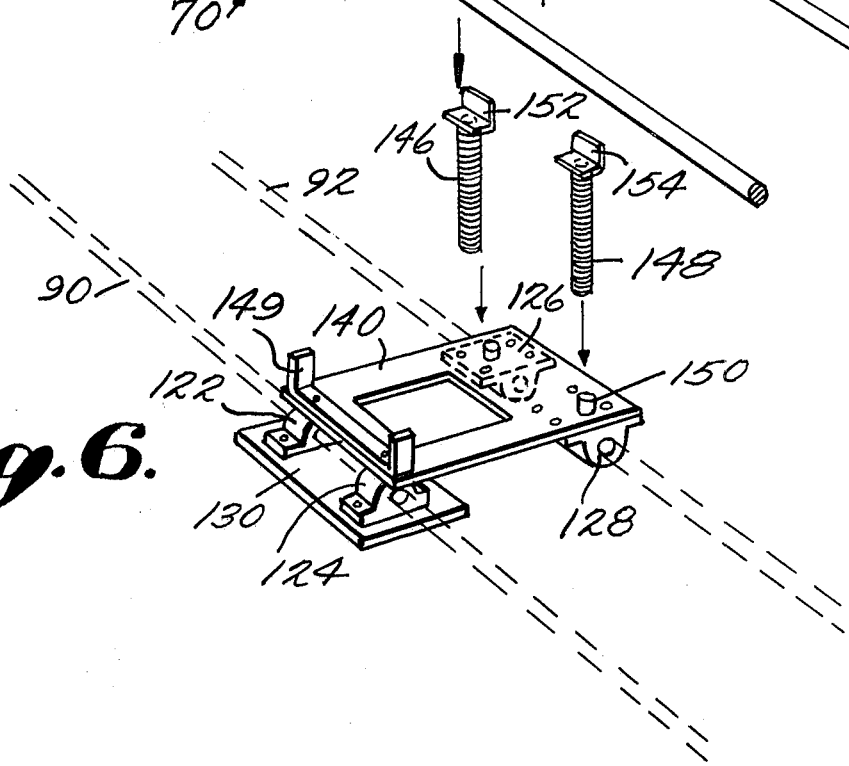
FIG. 6 is a perspective view of the pivotal support device located within the carriage assembly for attaching the carriage assembly to the frame shown in FIG. 5.

Turning now to FIGS. 3, 5 and 6, housing 70 of the carriage assembly 14 is supported on guide rods 90 and 92 by means of slide bearings 122, 124, 126 and 128 and, more particularly, pivotally mounted about rod 90. A support plate 130 is fixedly attached to bearings 122 and 124 by means of suitable bolts 132. The plate 130 is, in turn, attached to the housing 70 and specifically to the bottom plate member 78 as by means of bolts 134. As will be noted in FIG. 3, a spacer block 136 can be provided between support plate 130 and bottom plate 78 of the housing 70 so as to properly position carriage assembly 14 in a correct normal floating position within frame 12 when the device is not being used. When carriage assembly 14 is in its normal floating position, router 22 is positioned above and out of contact with the top of the workpiece 64 and stylus assembly 16 is positioned above and out of contact with template assembly 18.

A support plate 140 is secured to the tops of slide bearings 122 and 124 as by welding and is also secured as by means of screws or the like to slide bearings 126 and 128.

Compression springs 146 and 148 connect support plate 140 to housing 70 and are retained on the support plate 140 by lugs 150 which are offset to the rear from the pivot about rod 90 so that the weight of the router holds plate 140 down at all times. Springs 146 and 148 further engage mounting brackets 152 and 154 which are secured to the housing 70 by means of suitable bolts. Bracket 149 floats freely and acts to stabilize plate 140. The outer surface of the uprights on plate 149 slidingly engages housing 70. When compressed, springs 146 and 148 are supported by guide rod 92.

Thus, the housing 70 of carriage assembly 14 is supported on support assembly by means of slide bearings 122 and 124, the support plate 130 and compression springs 146 and 148. By supporting the carriage assembly 14 in this manner, carriage assembly 14 can pivot about rod 90 when the carriage assembly 14 is pivoted downward by the operator to cause stylus assembly 16 and router 22 to respectively engage template assembly 18 and workpiece 64. As shown in FIG. 3, conventional router 22 is preferably provided with handles 158 which allow the operator to effect the rotation of, and control the operation of, the carriage assembly 14 during engraving. Springs 146 and 148 urge the carriage assembly 14 upward so as to pivot assembly 14 to a position to disengage both the stylus assembly 16 and router 22 from template assembly 18 and workpiece 64 respectively when the router is released. Thus, when the operator releases downward pressure on handles 158, springs 146 and 148 serve to automatically move the stylus assembly 16 and the cutting device 22 upward to a disengaged position and to thereafter maintain that position.

It should also be noted that when router 22 is not engaged with the workpiece 64 or when the housing 70 is in its normal position as is shown in FIG. 3, the bottom of housing 70 will remain tilted upwardly at a slight angle away from the horizontal plane established by the top of platform 66.

Figure 4:
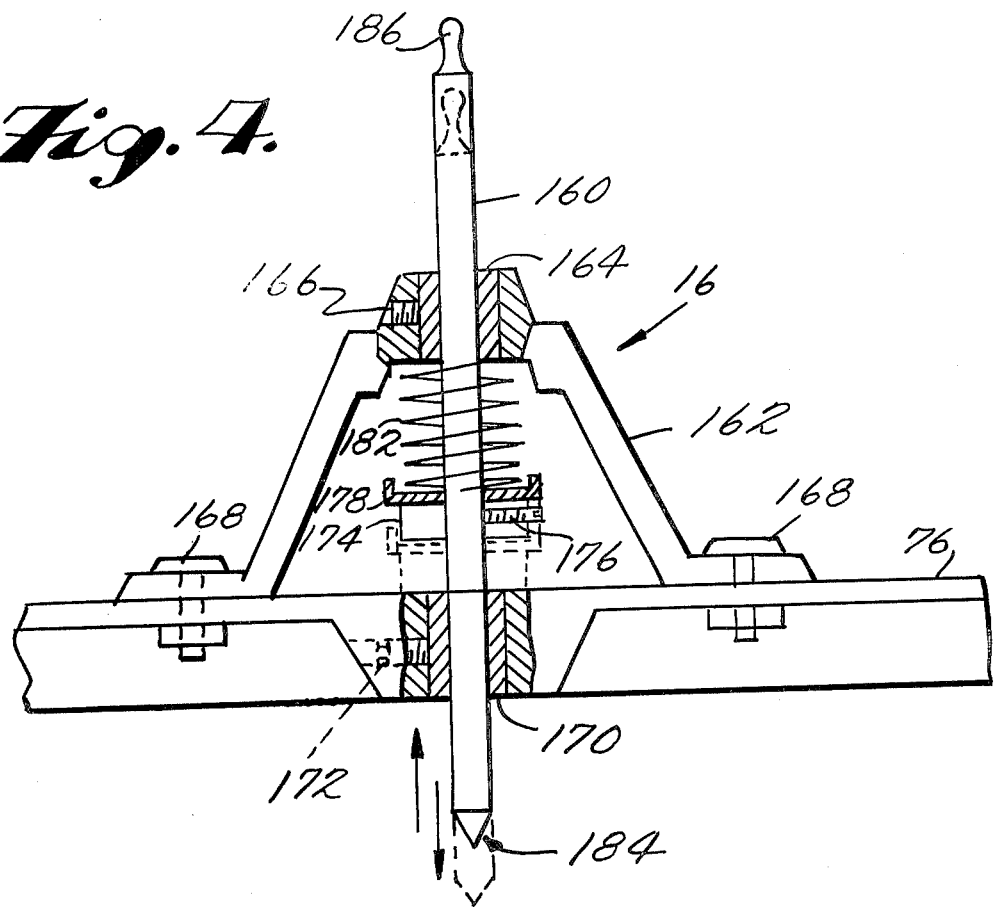
FIG. 4 is an enlarged view of the stylus assembly.

Turning now to FIG. 4, the stylus assembly 16 is comprised of a stylus 160 which, as shown in solid lines, is in its tracing position and also as shown in phantom in its normal position prior to being brought into engagement with the template assembly 18.

Stylus 160 is supported on housing 70 by means of a mounting bracket 162 and the top portion of stylus 160 is slidingly retained within a bushing 164 held in the top of the mounting bracket 162 by means of set screw 166. Mounting bracket 162 is attached to top member 76 of the carriage assembly 14 by means of bolt/nut assemblies 168. A bushing 170 is secured to the top member 76 as by means of a set screw 172 and the lower portion of stylus 160 is slidingly retained within the bushing 170. A collar 172 is secured to the stylus 160 by means of a set screw 176 and a cup washer 178 is attached to the collar 174 as by any convenient means such as by welding. A compression spring 182 is secured between the cup washer 178 and that portion of the mounting bracket 162 in which the bushing 164 is retained. When the stylus 160 is in its normal position out of contact with the template assembly 18, as shown in phantom lines, the collar 174 is forced into contact with and rests on the top member 76 of the carriage assembly 14. The stylus 160, as shown in solid lines, is in its tracing position and the effect of spring 182 has been overcome.

As was indicated previously, stylus assembly 16 and router 22 are both fixed to carriage assembly 14 and accordingly move together. The relationship between the stylus assembly 16 and router 22 on the carriage assembly 14 is such that router 22, and specifically the cutting element 84, does not contact workpiece 64 until the stylus 160 has assumed the tracing position as is shown in solid lines in FIG. 4. Thus, when the operator is ready to use the device and pivots housing 70 downward, stylus 160 contacts template assembly 18. If he is satisfied that the stylus is correctly positioned, the operator then continues pushing down pivoting housing 70 until the cutting element cuts to the desired depth.

As housing 70 pivots further, stylus 160 moves upward against the urging of spring 182 and with respect to housing 70 (although, in fact, remaining stationary) until collar 174 contacts cup washer 178. Set screws 166 and 172 are retainers for the bushings and remain constant. Set screw 176 adjusts the collar for depth of stylus (not depth of cut). The stylus is seldom adjusted and only when woodstock is thicker than normal or over the 1½ inches normal surface level. If the router sets higher, the stylus is higher and must be adjusted downward to touch letter first, before router bit touches woodstock. In this manner, correct location of the stylus 160 with respect to the template assembly 18 can be assured prior to cutting so that the cutting element 84 will not be inadvertently placed incorrectly on the workpiece 64.

Stylus 160 is provided on one end with a sharp point 184 and on the other with a rounded, ball end 186. Set screws 166 and 172 permit the stylus to be reversed as desired. Sharp point 184 can be used to trace templates where the pattern is indented. The rounded point works particularly well for tracing designs drawn on elastic templates, for example, of gasket rubber. The ball joint, when pressed, makes a slight indentation in the rubber which helps keep the stylus within the drawn pattern as that pattern is traced.

The template assembly 18 as shown in FIGS. 1 and 3, is comprised of a pair of angle members 190 and 191 which extend between the vertical supports 34 and 36. Angle members 190 and 191 can be moved toward and away from each other to accommodate a variety of sizes of template. The templates 192 which can be used with the device as described herein are of a conventional design and type. Separate templates for each letter, number or symbol can be used instead of a one piece design. Also employed with the template assembly in a spacer or filler block 194 used to pad the templates near the top surface of angle members 190 and 191. The templates may vary in height and filler block 194 is varied correspondingly. Filler block 194 is preferably narrower to allow positive clamping of the template by a conventional bar lamp 195. Rubber tread is preferably provided between bar clamp 199 and members 190 and 191 to ensure a good grip.

An adjustable centering scale 197 is provided in a recess of block 194 to match with front centering scale 48. The templates are preferably of clear plastic so that scale 197 can be read on the template. Centering scale 197 is secured as shown in FIG. 1 by spring clamps 199 and 201.

As was indicated previously, clamping devices 58 and 60 hold the workpiece 64 within the device in a clamped condition. As shown in FIG. 3, each of the clamps 58 and 60 is a conventional clamping device comprised of a clamping extension rod 200 slidably mounted in the front and rear base members 24 and 26, an end cap 201 to keep the rod 200 from being pulled out of the rear member 26, a clamping member 202 and an exterior mounting plate 204. A front clamping member 206 rotatably secured to the extension rod 200 and a handle 208 having a threaded rod 210 extending therefrom engages clamping member 206 and is rotatably secured within exterior mounting plate 204. Clamping member 202 is provided with pivotal retaining lug 212, which when moved in one direction allows the clamping member 202 to slide along the rod 200. As indicated above, frame 12 is provided with openings to allow the engraving of workpieces of various lengths. Such openings must be aligned with clamping devices 58 and 60 so that workpieces having a length greater than the length of frame 12 can be inserted within clamping devices 58 and 60. It should be understood that other approaches can also be employed to provide access to the work holding portion of frame 12 as, for example, by forming a C-shaped area within front vertical supports 32 and 36 adjacent to and aligned with work holding portion of frame 12.

A filler or spacer block 214 as shown in FIG. 3 can be used between workpiece 64 and platform 66 with the width of block 214 being sufficiently narrower than the width of the workpiece so that the push rod 62 together with clamping devices 58 and 60 will securely hold workpiece 64 against front base member 24. Block 214 can be omitted to engrave a board of twice the thickness.

It should also be pointed out that the spacing blocks 136, 194 and 214 are of coordinated sizes so that the relationship between stylus 160 and cutting element 84 and each, respectively, to template 192 and workpiece 64, will remain as previously described irrespective of the thickness of the template being used and the thickness of the workpiece being engraved. It is important that the stylus continue to come into contact with the template 192 prior to any contact between the cutting element 84 and the workpiece 64. Also, such spacing blocks assure that the point of the stylus 160 and the cutting element 84 are positioned above the template 192 and the workpiece 64 when the housing 70 is in its normal unrotated position as is shown in FIG. 3. The relative sizes and thicknesses of the space blocks are coordinated and selected according to the thickness of the workpiece 64 being engraved.

Figure 7:
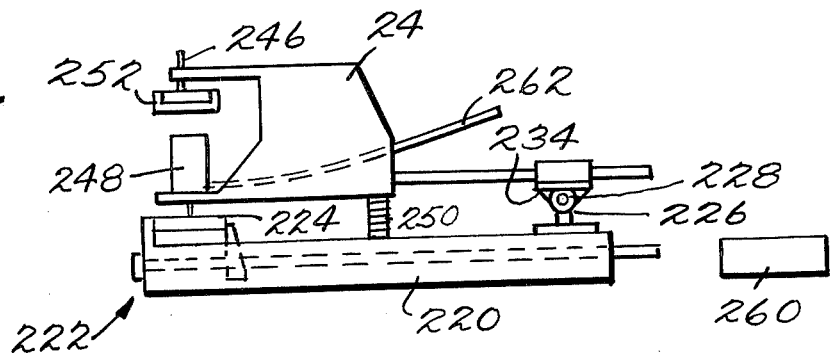
FIG. 7 is a diagrammatic side elevational view of a second embodiment of the present invention.
Figure 8:
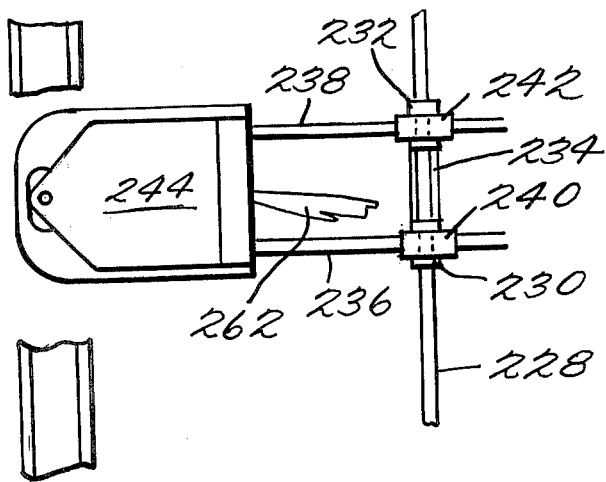
FIG. 8 is a diagrammatic top plan view of the second embodiment shown in FIG. 7.

Turning now to FIGS. 7 and 8, which illustrate a second preferred exemplary embodiment of the present invention, base 220 supports a clamping device 222, workpiece 224 and a pair of vertical supports 226 which support a horizontal rod 228. Slidably mounted on the horizontal rod 228 are bushings 230 and 232 and a support plate 234 is suitably attached to the bushings 230 and 232 as by welding (not shown) and which ensures that the bushings 230 and 232 remain rigidly connected together. Support rods 236 and 238 are placed within bushing 240 and 242 which in turn are secured to support plate 234. Attached to the rods 236 and 238 is a carriage assembly 244 which supports a stylus assembly 246 and router 248. The router section is picked up manually by the operator and removed into the initial cut and to each letter thereafter. No spring assistance is provided here. Assistance is provided by the pivot from the rear rod assembly 230 and 232.

In this embodiment, the carriage assembly 244 again maintains a fixed relationship between the stylus assembly 246 and router 248 which also are held in separate vertically spaced horizontal planes. Further, the carriage assembly 244 is itself also movable in a given fixed plane since bearings 230 and 232 can slide across the machine on rod 228 and the carriage assembly 244 can slide transversely of the frame as bearings 240 and 242 move along 236 and 238.

Many changes and modifications in the above described embodiments of the invention can, of course, be made. Both embodiments of the present invention described herein are preferably provided with a conventional dust collector (not shown) which can be suitably connected to routers 22 and 248 by means of flexible tubing 262. Routers 22 and 248 preferably are conventional routers provided with a suitable blade for cutting the particular type of workpiece being engraved. While the workpiece preferably is of redwood, it should be understood that the workpiece can alternatively be plastic or metal. Likewise, it should be understood that other types of cutting devices, such as electrically heated cutting or engraving elements, can be used in place of the router referred to herein before. The frame assembly 12 is preferably constructed of metal such as stainless steel or aluminum but structural plastic can be used in place thereof. It is essential only that the material selected by sufficiently strong so as to not bend or otherwise fail during use. While the invention invention has been disclosed in its preferred exemplary forms, it is to be understood that the specific embodiment thereof as described and illustrated herein is not to be considered in a limited sense as there may be additional forms or modifications of the present invention which should also be construed as coming within the scope of the appended claims.

What is claimed:

1. An engraving machine comprising:
   frame means for supporting the machine, said frame means having front, rear and side portions;
   work holding means attached to said frame means for holding at least one piece of work being engraved;
   means attached to said frame means for mounting at least one template having a pattern thereon;
   cutting means for cutting said workpiece;
   tracing means for tracing the pattern on a template mounted in said mounting means including a stylus vertically movable with respect to said cutting means and frame means between a normal and tracing position, and a spring urging said stylus toward said normal position and toward said workpiece, said stylus being positioned closer to said template than the distance between said cutting means and said workpiece when said stylus is in said normal position so that said stylus contacts said template before said cutting means contacts said workpiece and then moves vertically with respect to said cutting means while in contact with said template and against the urging of said spring;
   carriage means movably mounted to said frame means so as to be movable in any direction within a given horizontal plane for supporting both said tracing means and said cutting means in a fixed relationship with respect to each other when said stylus is in said tracing position and in different vertically separated horizontal planes.

2. An engraving machine as in claim 1 wherein said template is adjustably mounted to said frame means so as to be movable forwardly and rearwardly along said frame means.

3. An engraving machine as in claim 2 wherein said template means includes template holding means for holding at least one template in a desired position and centering scales secured to said frame means at each end of said template means.

4. An engraving machine as in claim 1 wherein said template means is positioned directly above said work holding means.

5. An engraving machine as in claim 1 wherein said cutting means includes a router.

6. An engraving machine as in claim 1 wherein carriage means rotates said cutting means and said tracing means between normal and engraving positions.

7. An engraving machine as in claim 1 wherein the side members on each side of said frame means define an opening in each side of said frame means so as to allow workpieces having a length greater than said frame means to be positioned within said frame means and said work holding means.

8. An engraving machine as in claim 6 wherein said carriage means includes positioning means for maintaining said carriage means in said normal position when said carriage means is not moved into said engraving position.

9. An engraving machine as in claim 8 wherein said positioning means comprises compression springs.

10. An engraving machine as in claim 1 wherein said stylus has a sharp point on one end and a rounded point on the other end and means for mounting said stylus.

11. An engraving machine as in claim 10 wherein said stylus mounting means includes a bracket having a bore extending therethrough for receiving said stylus, a set screw mounted for engaging a stylus in said bore to hold said stylus in an adjustable position, and a collar on said stylus, and wherein said spring is mounted between said collar and said bracket for urging said stylus downward toward said template.

12. An engraving machine as in claim 11 wherein said stylus mounting means further includes a base member having a further bore extending therethrough for receiving said stylus, means for attaching said bracket to said base member and including means for adjusting the position of said collar on said stylus.

13. An engraving machine as in claim 1 wherein said carriage means includes a carriage assembly having a plurality of members mounting said tracing means and cutting means in fixed orientation, a first pair of parallel rods extending between the front and rear portions of said frame means, a pair of first bearing means respectively engaging said first pair of rods for movement therealong, a second pair of bearing means respectively engaging said second pair of rods, a second pair of parallel rods extending between said first bearings and means for pivotably connecting said carriage assembly to said second pair of bearing means for pivotable movement between a workpiece engaging position and a disengaged position about an axis parallel to said second pair of rods.

14. An engraving machine as in claim 13 wherein said pivotably connecting means includes a platform member rigidly connected to said second pair of bearings, means pivotably connecting said carriage assembly to said platform member at a first location, and a pair of compression springs connecting said platform member to said carriage assembly at a second location.

* * * * *